United States Patent
Wang et al.

(10) Patent No.: US 10,250,094 B2
(45) Date of Patent: Apr. 2, 2019

(54) WOUND STATOR OF AN ALTERNATOR AND VEHICLE ALTERNATOR

(71) Applicant: Victory Industrial Corporation, New Taipei (TW)

(72) Inventors: Chun-Yuan Wang, New Taipei (TW); Ming-Laang Liou, New Taipei (TW)

(73) Assignee: Victory Industrial Corporation, New Taipei (TW)

( * ) Notice: Subject to any disclaimer, the term of this patent is extended or adjusted under 35 U.S.C. 154(b) by 300 days.

(21) Appl. No.: 15/160,265

(22) Filed: May 20, 2016

(65) Prior Publication Data

US 2016/0268861 A1    Sep. 15, 2016

Related U.S. Application Data

(63) Continuation-in-part of application No. 14/467,057, filed on Aug. 25, 2014, now Pat. No. 9,831,732, and
(Continued)

(30) Foreign Application Priority Data

Jul. 1, 2014 (TW) .............................. 103122764 A
Jul. 1, 2014 (TW) .............................. 103122779 A
(Continued)

(51) Int. Cl.
*H02K 3/04* (2006.01)
*H02K 3/28* (2006.01)
(Continued)

(52) U.S. Cl.
CPC ............... *H02K 3/28* (2013.01); *H02K 1/226* (2013.01); *H02K 1/243* (2013.01); *H02K 3/12* (2013.01);
(Continued)

(58) Field of Classification Search
CPC ........... H02K 15/0478; H02K 15/0471; H02K 15/0492; H02K 3/12
(Continued)

(56) References Cited

U.S. PATENT DOCUMENTS 6,501,205 B1 * 12/2002 Asao ..................... H02K 3/12
                                                          310/184
7,281,312 B2 * 10/2007 Sadiku ................. H02K 15/066
                                                          29/596
(Continued)

FOREIGN PATENT DOCUMENTS

CN      101371423 A      2/2009
CN      204391912 U      6/2015
(Continued)

OTHER PUBLICATIONS

TW examination report for related TW application 104 139 765.

*Primary Examiner* — Hanh N Nguyen
(74) *Attorney, Agent, or Firm* — Clifford Perry

(57) ABSTRACT

The present invention relates to a wound stator of an alternator, which comprises: a stator and a group of wires wound thereon. The group of wires comprises a plurality of abreast wires sequentially embedded in corresponding grooves of the stator, and the abreast wires in the grooves are oriented in a radial direction of the stator.

8 Claims, 12 Drawing Sheets

Related U.S. Application Data a continuation-in-part of application No. 14/467,058, filed on Aug. 25, 2014, and a continuation-in-part of application No. 14/467,060, filed on Aug. 25, 2014, now Pat. No. 9,831,730, and a continuation-in-part of application No. 14/467,062, filed on Aug. 25, 2014, now abandoned.

(30) Foreign Application Priority Data

| | | |
|---|---|---|
| Jul. 1, 2014 | (TW) | 103122780 A |
| Jul. 1, 2014 | (TW) | 103122782 A |
| Nov. 27, 2015 | (TW) | 104139765 A |

(51) Int. Cl.

| | |
|---|---|
| *H02K 1/24* | (2006.01) |
| *H02K 1/22* | (2006.01) |
| *H02K 3/12* | (2006.01) |
| *H02K 21/04* | (2006.01) |
| *H02K 15/04* | (2006.01) |
| *H02K 3/34* | (2006.01) |

(52) U.S. Cl.
CPC ....... *H02K 15/0478* (2013.01); *H02K 21/044* (2013.01); *H02K 3/345* (2013.01)

(58) Field of Classification Search
USPC .......................................... 310/201, 207, 208
See application file for complete search history.

(56) References Cited

U.S. PATENT DOCUMENTS

| | | | | |
|---|---|---|---|---|
| 8,297,101 | B2* | 10/2012 | Bowman | B21F 1/00 |
| | | | | 72/379.6 |
| 2003/0011268 | A1 | 1/2003 | Even et al. | |
| 2004/0261255 | A1* | 12/2004 | Stroebel | H02K 3/28 |
| | | | | 29/606 |
| 2009/0121576 | A1* | 5/2009 | Even | H02K 3/12 |
| | | | | 310/208 |
| 2009/0260217 | A1* | 10/2009 | Kamakura | H02K 3/12 |
| | | | | 29/596 |
| 2015/0214794 | A1 | 7/2015 | Chang et al. | |
| 2016/0006308 | A1 | 1/2016 | Wang et al. | |

FOREIGN PATENT DOCUMENTS

| | | |
|---|---|---|
| FR | 2968858 B1 | 7/2013 |
| TW | M 495672 U | 2/2015 |
| TW | 201530980 A | 8/2015 |

* cited by examiner

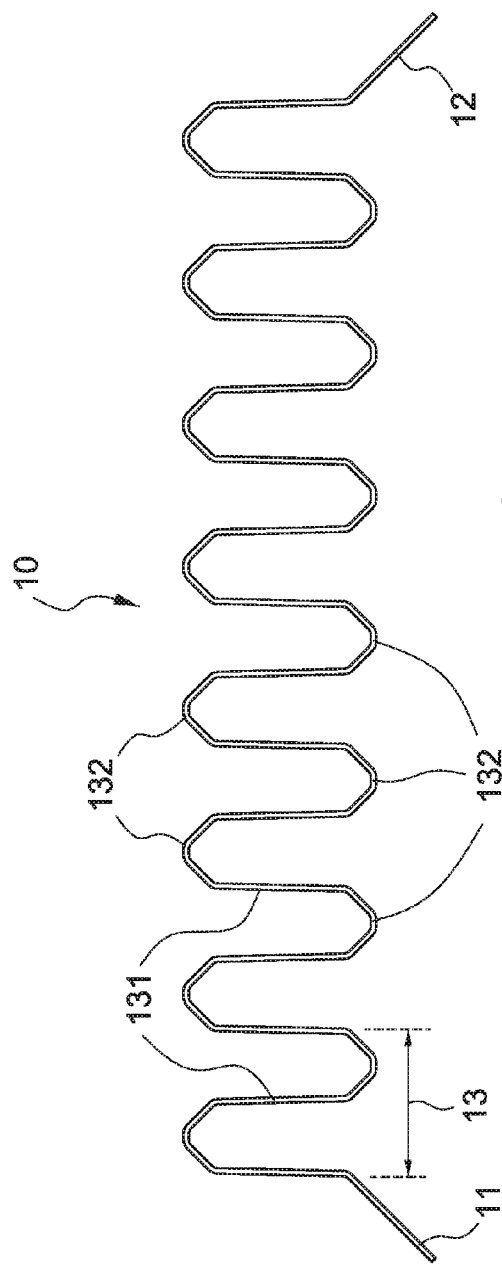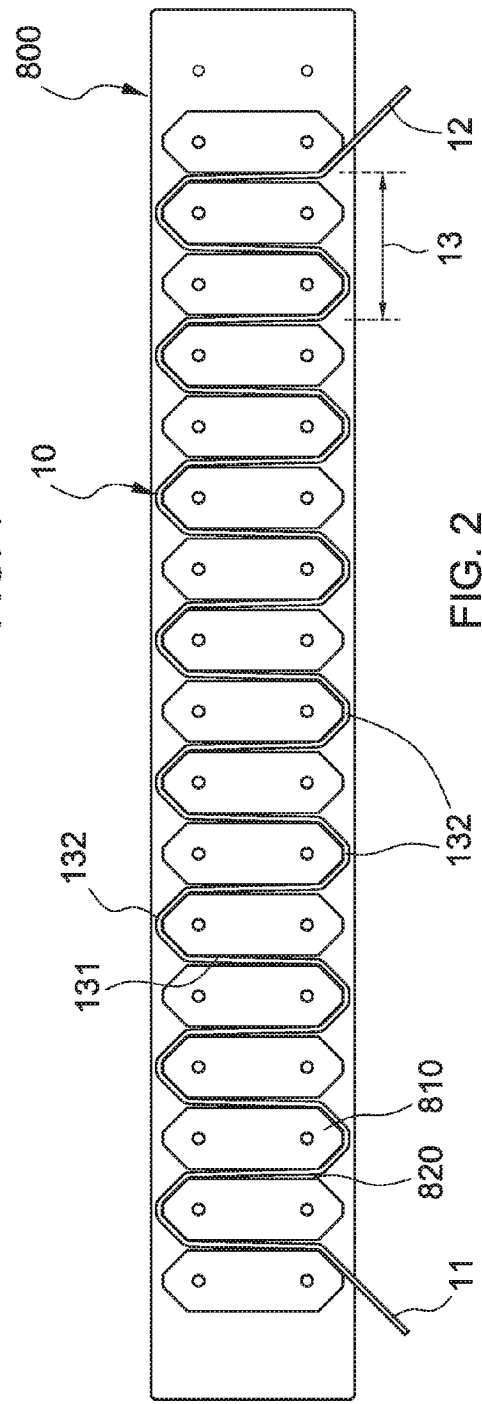

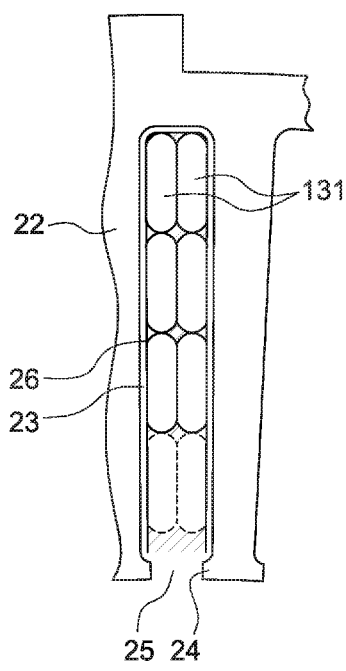
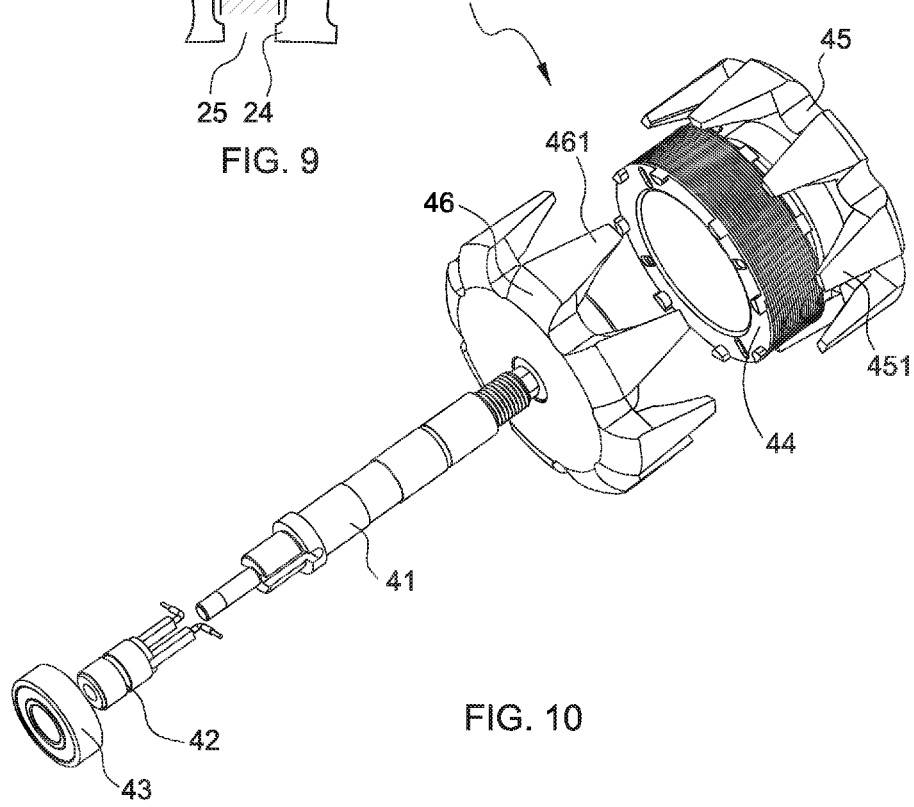
FIG. 9
FIG. 10

WOUND STATOR OF AN ALTERNATOR AND VEHICLE ALTERNATOR

BACKGROUND

Field of the Invention

The present invention relates to a wound stator of an alternator, more particularly to a wound stator of an alternator having double abreast wires embedded in grooves of a stator.

Description of Related Art

An alternator is used for converting mechanical energy into alternating-current electric energy. In a vehicle alternator, the output power of an engine drives a rotor of the generator to rotate within a stator to convert mechanical energy of the engine into electric energy to charge a storage battery, which then supplies electric energy to electrical parts of a vehicle.

A vehicle alternator typically has an annular stator and a rotor. By means of rapid rotation of the rotor in the stator, magnetic fields are formed by wires wound on the stator so as to generate an induced electromotive force (voltage) in the wires. In general, the voltage output by the alternator is proportional to the number of coil groups in a stator ring. Therefore, the higher the density of wires wound on a stator ring, the higher the power generation of the generator.

A variety of coil winding methods have been adopted for a conventional generator, such as folding and winding, or wave-shaped winding. The choice of winding method has an influence on the output voltage of the generator at low rotational speed or high rotational speed resulting in specific output characteristics of an alternator at different rotational speeds. For example, factors concerning the output characteristics of an alternator include the diameter of the conducting wires and the number of wound coils. Under high rotational speed, the output current of the alternator usually increases or decreases along with the wire diameter. Furthermore, under low rotational speed, the output current of the alternator usually increases or decreases along with the number of coils. Therefore, design choices of conducting wire diameter and winding method vary depending upon the desired output characteristics.

Moreover, the stator of an alternator is positioned such that it surrounds the rotor. When the rotor is rotated with respect to the stator, the coils wound on the stator are induced because of electromagnet effect and thus generate alternating current. The rotor normally comprises a first claw pole element and a second claw pole element in which a plurality of the N-pole claw-shaped bodies of the first claw pole element and a plurality of the S-pole claw-shaped bodies of the second claw pole element are respectively adjacent to each other while spaced apart. After an electric current is supplied to the magnetic-field coil of the rotor 1, a claw pole element of the poles and the other claw pole element can be magnetized into an N pole and an S pole, respectively, due to electromagnetic induction so that each pair of adjacent claw-shaped bodies of the claw pole elements can generate a magnetic field. When the rotor rotates, direction of the magnetic field also changes with rotation of the rotor to further create an electromagnetic induction with the stator coils of the stator to generate an alternating current. However, for a rotor of a generally conventional alternator, after an electric current is supplied to the magnetic-field coil and when the first claw pole element and the second claw pole element of the pole are magnetized into an N pole and an S pole, respectively, due to electromagnetic induction, part of the magnetic lines may directly pass from a space between two adjacent claw-shaped bodies of the claw pole elements and may not participate in formation of the magnetic field of the pole. Such phenomenon is called "magnetic leakage." Magnetic leakage may cause unnecessary magnetic loss and reduce the strength of the magnetic field formed by the pole, which further reduces the generating capacity of the alternator.

In view of the above, optimization of a wire structure and the winding manner as adopted for the wound stator, and also improvement to the rotor structure are desired in order to enhance the output efficacy of an alternator.

BRIEF SUMMARY OF THE INVENTION

An objective of one embodiment of the present invention is to provide a wound stator of an alternator having improved output efficacy.

Another objective of another embodiment of the present invention is to provide a combined wound stator and rotor structure of an alternator having improved output efficacy.

An embodiment of the present invention discloses a wound stator of an alternator, comprising: a stator; and a group of wires for a stator comprising a plurality of abreast wires arranged in a radial direction, wherein the group of wires for a stator are embedded in corresponding grooves of the stator sequentially.

Another embodiment of the present invention discloses a wound stator for an alternator. The wound stator comprises: a stator and two abreast wires wherein the stator has a plurality of radial grooves arranged at an inner circumference of the stator and each of the two abreast wires comprises a first end, a second end and a plurality of wave-shaped coils located between the first end and second end. Each wave-shaped coil is formed of straight portions and curved portions that alternate with each other, wherein each of the wires is pressed so that the cross section of the straight portions is of a generally elliptical shape. The straight portions of the two abreast wires are sequentially embedded in corresponding grooves of the stator and the two abreast wires in the grooves are oriented in a direction along the circumferential direction of the stator.

A further embodiment of the present invention discloses an alternator for a vehicle, comprising: a wound stator of an alternator according to the above embodiments, a rotor comprising a first claw pole element and a second claw pole element opposite thereto, wherein the first claw pole element has a plurality of N-pole claw-shaped bodies, the second claw pole element has S-pole claw-shaped bodies in which the number of the N-pole claw-shaped bodies is the same as that of the S-pole claw-shaped bodies, wherein when the first claw pole element and the second claw pole element are combined with each other, the plurality of N-pole claw-shaped bodies of the first claw pole element and the plurality of S-pole claw-shaped bodies of the second claw pole element are respectively adjacent to each other while spaced apart; wherein a permanent magnet is fixedly disposed between at least one N-pole claw-shaped body of the first claw pole element and its adjacent S-pole claw-shaped body of the second claw pole element, wherein an N polar end of the permanent magnet is in contact with the N-pole claw-shaped body of the first claw pole element, and an S polar end of the permanent magnet is in contact with the S-pole claw-shaped body of the second claw pole element, wherein the rotor is coaxially arranged within the wound stator of the alternator.

BRIEF DESCRIPTION OF THE DRAWINGS

FIG. 1 is a schematic view of a wire for a stator according to an embodiment of the present invention;

FIG. 2 is a schematic view of a wire template for fabricating a wire for a stator;

FIG. 9 is a partial, sectional view of a wound stator according to an embodiment of the present invention having double abreast wires embedded in a groove of the stator wherein the double abreast wires are oriented along the circumferential direction of the stator;

FIG. 10 is an exploded view of a rotor of an alternating-current generator according to an embodiment of the present invention;

DETAILED DESCRIPTION OF THE EXEMPLARY EMBODIMENTS

Figure 3A:
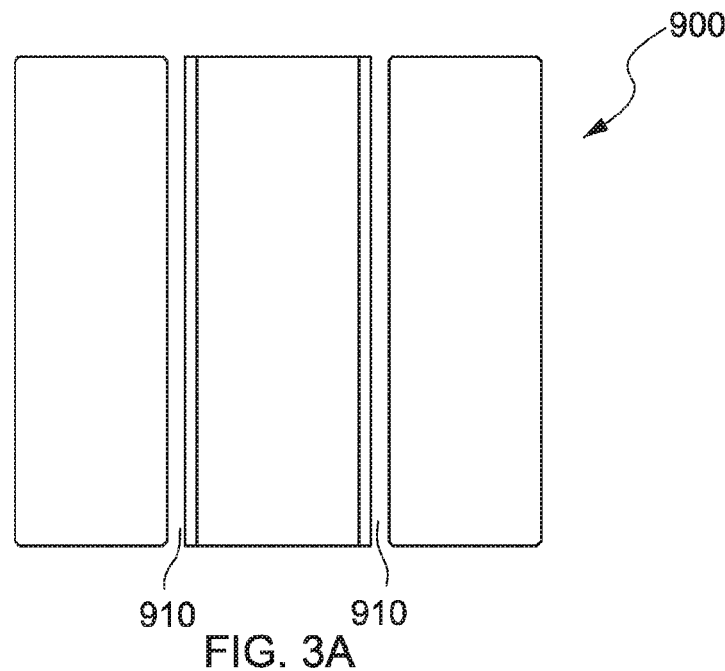
FIG. 3A is a schematic top view of a flattening jig.

The characteristics, subject matter, advantages, and effects of the present invention are detailed hereinafter by reference to embodiments of the present invention and the accompanying drawings. It is understood that the drawings referred to in the following description are intended only for purposes of illustration and do not necessarily show the actual proportion and precise arrangement of the embodiments. Therefore, the proportion and arrangement shown in the drawings should not be construed as limiting or restricting the scope of the present invention.

FIG. 1 is a schematic view of a wave-shaped wire for a stator of a vehicle alternator according to one embodiment of the present invention. As shown in FIG. 1, a wire 10 includes a first end 11, a second end 12, and a plurality of wave-shaped coils 13 located between the first end 11 and the second end 12, and each wave-shaped coil 13 is formed by a plurality of straight portions 131 and a plurality of curved portions 132 that alternate with each other. For example, a wave-shaped coil 13 may be regarded as one sine shape formed of a straight portion(s) 131 and a curved portion(s) 132. The number of wave-shaped coils of the wire 10 may also be regarded as, for example, the number of curved portions 132 that open downwards in FIG. 1 (in FIG. 1, there are 8 curved portions 132 which can be regarded as 8 coils). The number of wave-shaped coils of the wire 10 may be 6 to 8, or may be a larger number of turns, for example, 12 to 16. For the material of the wire 10, an enameled copper with a circular cross section is typically used. Alternatively, to increase wire density after the stator is assembled, the straight portion 131 of the wire 10 may be pressed flat by using a jig, making the cross section of the straight portion 131 into a square shape, a rectangular shape, an elliptic shape or the like. In the present embodiment, the straight portions 131 of the wire 10 are flattened to form generally an elliptical cross section having opposed flat sides (as shown in FIG. 3C). The advantage of such an approach lies in that, compared with an approach in which a flat wire is used to increase wire density in a stator groove (to reduce an air gap ratio), the cost of using a flat copper wire is much higher than that of using a common round copper wire that is partially pressed flat later. This is because when a wire is wound in a stator groove, a curved part that is not in the stator groove does not have an air gap ratio problem; the use of a partially flattened wire of the present invention can not only achieve the same effects of increasing wire density and lowering air gap ratio between wires as using a flat wire but it also effectively saves manufacturing cost. Certainly, a flat wire can be directly used to pursue desirable power generation efficacy. In this case, the cross sections of both the straight portion 231 and curved portion 232 would have a square shape, a rectangular shape, an elliptic shape or the like with flat sides.

Furthermore, the wire 10 with the desired shape may be implemented by using a wire template 800, such as the one shown in FIG. 2. In a manufacturing process of the wire, a long and straight wire is bent along shaped contours of wire template bumps 810 and winds through gaps 820 in the wire template bumps 810 in an alternative manner. Since the contours of the wire template bumps 810 have shapes that conform to those of the straight portion 131 and the curved portion 132 of the wire 10, through the above manufacturing process, the desired wave-shaped coils 13 having the straight portions 131 and the curved portions 132 that alternate with each other are formed.

Figure 3B:
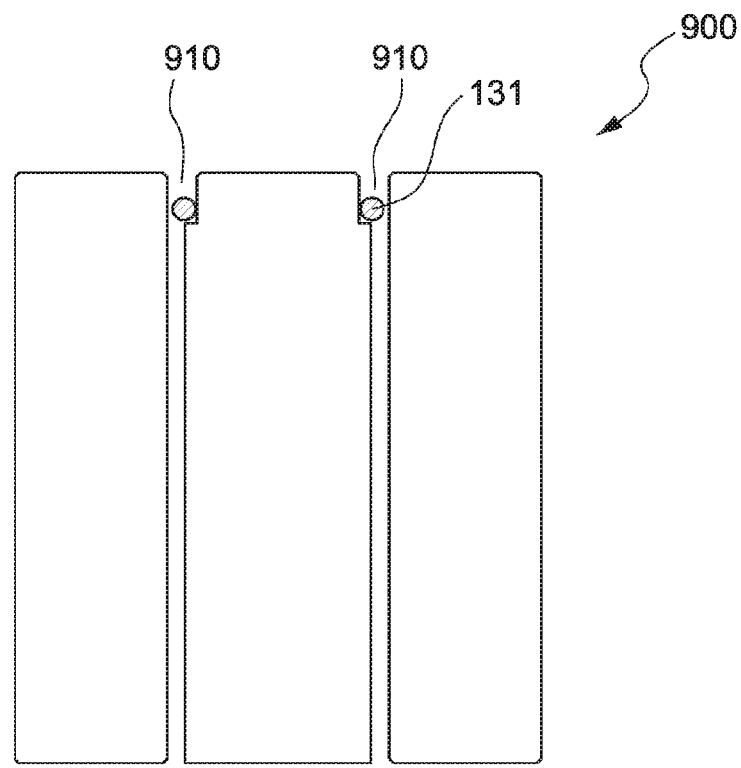
FIG. 3B is a schematic side view of the flattening jig.
Figure 3C:
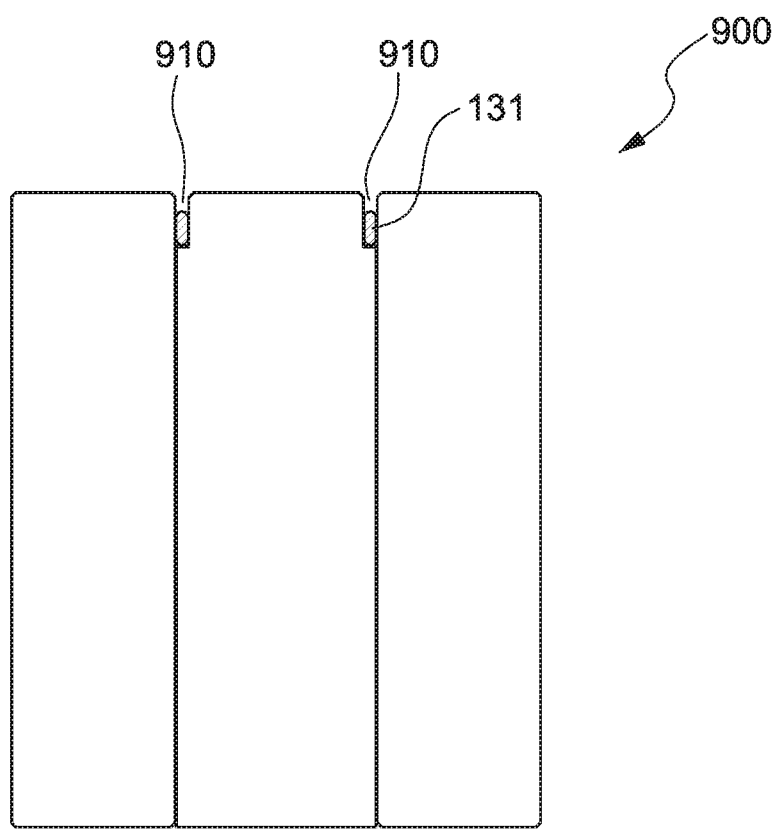
FIG. 3C is a schematic side view showing that the wires are flattened by the flattening jig.

Further, after the wire 10 is finished, a flattening jig may be used to implement flattening of the straight portions 131 to make the cross sections of the straight portions 131 into a noncircular shape, for example, as shown by the flattening jig 900 in FIG. 3A to FIG. 3C. FIG. 3A is a top view of a flattening jig 900, which has clamping grooves 910 to receive the straight portions 131 of the wire 10. Further, as shown in FIG. 3B, the straight portions 131 (circular cross sections) of the wire 10 may be placed inside the clamping grooves 910 of the flattening jig 900 and the wire 10 may be pressed from its sides to be flattened into the required shape or size, so as to obtain the flattening forms of the straight portions 131 of the wire 10 shown in FIG. 3C (i.e., a generally elliptical-shaped cross section having opposite flat sides); in this case, the wire 10 is a partially flattened wire in which the curved portions 132 remain round in shape.

Figure 4A:
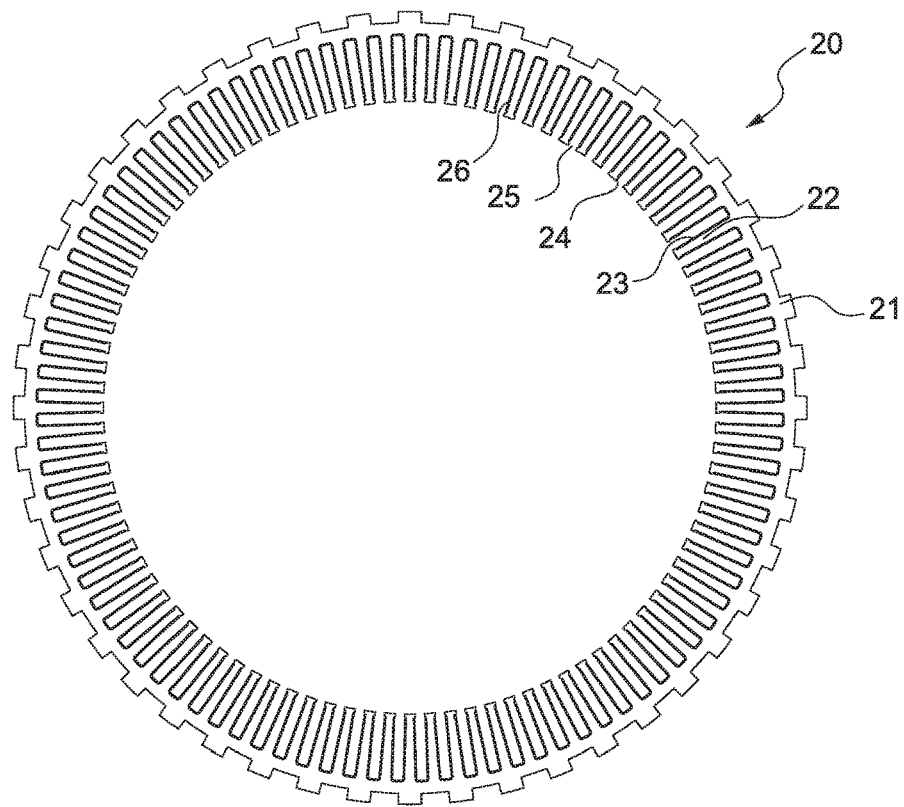
FIG. 4A is a schematic view of a stator ring according to an embodiment of the present invention.
Figure 4B:
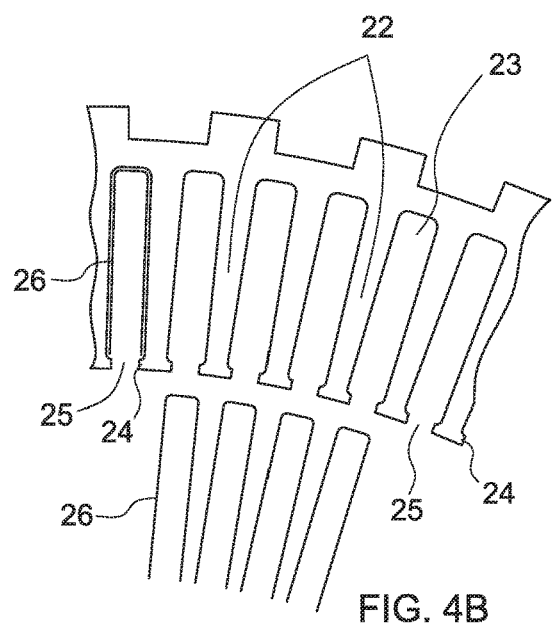
FIG. 4B is a partially enlarged view of FIG. 4A.

FIG. 4A is a stator structure according to one embodiment of the present invention. As shown in FIG. 4A, a stator 20 has an annular body 21, where a plurality of radial elongated grooves 23 separated by separating posts 22 is formed at an inner circumference of the stator. The number of grooves 23 is, but is not limited to, for example, 72 to 96 (96 grooves in FIG. 4A). An end of the separating post 22 slightly protrudes from its two adjacent sides to form a magnetic shoe 24, and an opening 25 of the groove 23 is formed between two magnetic shoes 24. Generally speaking, the stator 20 is made of a material with desirable electrical and magnetic field properties, for example, cold-rolled steel plate (SPCC), silicon steel or other similar materials. An electrical insulating material 26 may be laid on the surface of the elongated groove 23 of the stator. As shown in FIG. 4B, for the electrical insulating material 26, a sheet-form material is folded to fit the shape of the surface of the radial elongated groove 23 inside the stator 20 and is directly embedded in the groove 33 to cover the surface of the groove 33. The electrical insulating material 26 can be made of a material such as pressed paper board, plastic film, polyester film, aramid paper, and epoxy resin.

The plurality of elongated grooves 23 of the stator 20 are used for the winding of the wire 10. In particular, each straight portion 131 of the wave-shaped coil 13 of the wire 10 is, starting from the first end 11 of the wire 10, sequentially embedded in the corresponding grooves 23 of the stator 20 and juts out from one of the corresponding grooves with the second end 12 of the wire 10. In this case, the groove 23 has one embedded layer of the wire 10. A plurality of layers of the wire 10 may be embedded in the same groove to increase power generation. The winding work for the stator 20 is completed by embedding multiple wave-shaped wires 10 in all the grooves 23 of the stator 20, such that each groove 23 has embedded wires. The details of the winding work for the stator 20 are further illustrated below by way of an explanatory embodiment according to the present invention.

Figure 5A:
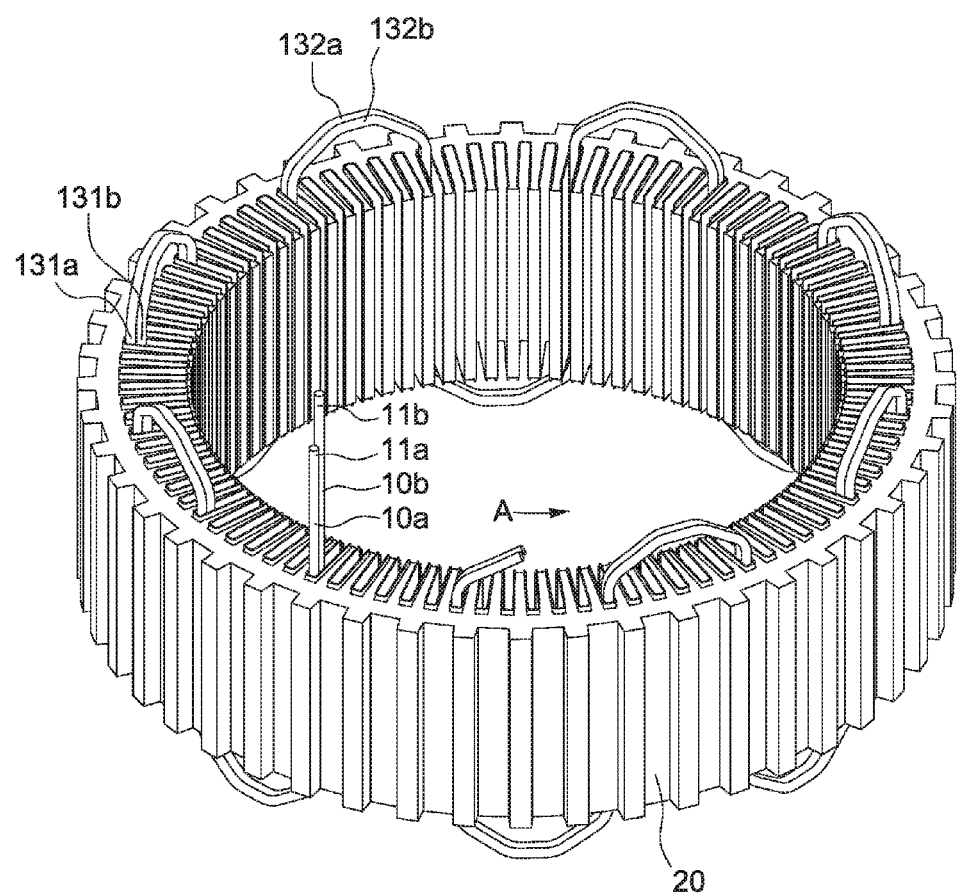
FIG. 5A is a schematic view of a stator winding according to an embodiment of the present invention, which shows double abreast wires disposed in a radial direction and embedded into each groove of a groove group of first phase in a forward direction.
Figure 5B:
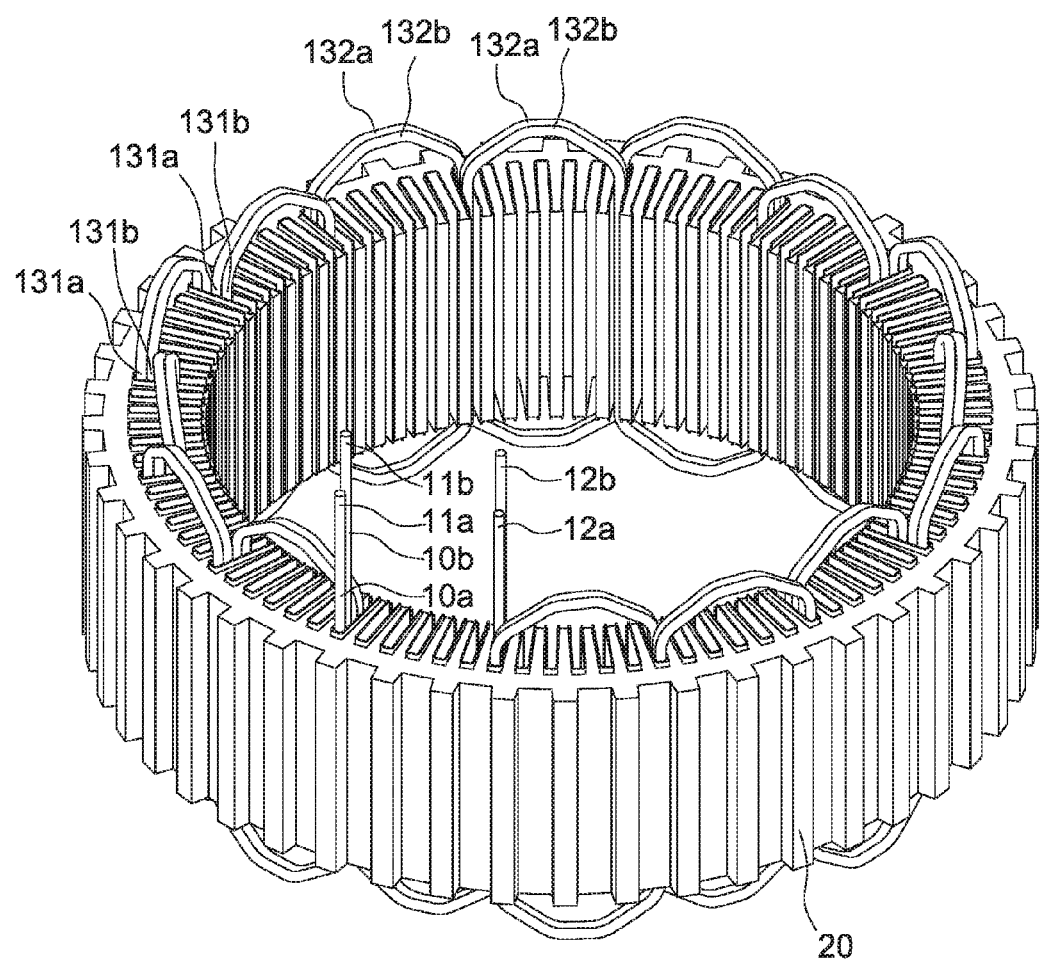
FIG. 5B is a schematic view of a stator winding according to an embodiment of the present invention, which shows that after the double abreast wires are embedded into each groove of the groove group in the forward direction in FIG. 5A, they are embedded therein in a reverse direction.

In FIG. 5A and FIG. 5B, a wave-shaped wire 10 for winding a stator 20 of the present invention is used. This embodiment shows how to fabricate a wound stator having two sets of three-phase power generations. As shown in FIGS. 4A and 4B, a stator 20 having 96 grooves is provided. For each phase of power generation, two windings and 32 grooves 23 are involved, and for each winding, 16 grooves are involved. In other words, if the $1^{st}$ and $2^{nd}$ grooves and corresponding grooves (that is, the $7^{th}$ and $8^{th}$ grooves, $13^{th}$ and $14^{th}$ grooves, ..., $91^{st}$ and $92^{nd}$ grooves) are for a first phase, the $3^{rd}$ and $4^{th}$ grooves and corresponding grooves (that is, the $9^{th}$ and $10^{th}$ grooves, $15^{th}$ and $16^{th}$ grooves, ..., and $93^{rd}$ and $94^{th}$ grooves) are for a second phase, and the $5^{th}$ and $6^{th}$ grooves and corresponding grooves (that is, the $1^{th}$ and $12^{th}$ grooves, $17^{th}$ and $18^{th}$ grooves, ..., and $95^{th}$ and $96^{th}$ grooves) are for a third phase. In this case, the 96 grooves 23 form a circle around the stator 20.

As shown in FIG. 5A, a pair of abreast wave-shaped wires 10a and 10b are disposed in the radial direction of the stator 20. The abreast straight portions 131a and 131b of the wires 10a and 10b are, starting from first ends 11a and 11b of the wires 10a and 10b, simultaneously embedded in the $1^{st}$ groove from one of the plurality of grooves 23 (annotated in FIG. 4B) of the stator 20 wherein the straight portions 131a and 131b are radially adjacent to each other in the $1^{st}$ groove. In this embodiment, the groove corresponding to the ends 11a and 11b of the wire 10a and 10b as shown in FIG. 5A is designated as the $1^{st}$ groove. Next, each pair of the abreast straight portions 131a and 131b of the wires 10a and 10b are sequentially and radially embedded in a forward direction (e.g. clockwise) in the $7^{th}$ groove, $13^{th}$ groove, $19^{th}$ groove, $25^{th}$ groove, ... until the $91^{st}$ groove to complete the winding of the wire around the entire circumference of the annular body 21 of the stator 20. When the abreast wires 10a and 10b jut out from the $91^{st}$ groove (the groove corresponding to the arrow A in FIG. 5A), 8 coils out of the 16 coils of the wires 10a and 10b are left outside the grooves (not shown). Next, referring to FIG. 5B, the rest of the abreast straight portions 131a and 131b of the wires 10a and 10b outside the grooves, starting from the $91^{st}$ groove, are radially embedded in a reverse direction (direction of arrow A; i.e., counterclockwise) in the corresponding grooves 33 that already have double abreast wires embedded therein from the forward winding, and after reverse winding around the entire circumference of the stator 20, the second ends 12a and 12b of the wires 10a and 10b jut out from the $91^{st}$ groove. In this way, the abreast wires 10a and 10b disposed in the radial direction wind around the stator 20 by two turns (one turn in the forward direction and the other in the reverse direction) to complete the winding of a set of wires for one phase (i.e., the grooves into which the wires 10a and 10b are embedded after winding form a winding set of one phase), and four wire ends, that is, the first ends 11a and 11b adjacent to each other in the radial direction, as well as the second ends 12a and 12b adjacent to each other in radial direction, are left outside the grooves 23 of the stator 20. Subsequently, based on the foregoing manner, double abreast wires 10 disposed in the radial direction are sequentially embedded in the next two groups of grooves (the $3^{rd}$ and $4^{th}$ grooves and the corresponding grooves) for the second phase and the further next two groups of grooves (the $5^{th}$ and $6^{th}$ grooves and the corresponding grooves) for the third phase so as to complete a stator winding having three phases of power generation windings; in this embodiment, each groove 23 of the stator 20 has a total of four layers of straight portions of the wires.

However, to increase power generation and enhance power generation efficacy, the grooves 23 of the stator 20 are not limited to receiving only four layers of the straight portions of the wires. For example, according to another preferred embodiment, in the foregoing groove set for the first phase and in the groove where the second ends 12a and 12b of the wires 10a and 10b respectively jut out, the first ends of an additional two of the same abreast wires 10 each having 8 coils are arranged in the radial direction and are respectively connected in series to the forgoing second ends 12a and 12b. Then, beginning with the first ends of the additional two wires 10, the abreast straight portions of the additional two wires disposed in the radial direction start to be embedded in the corresponding grooves in a forward direction around the entire circumference of the stator 20 from the $1^{st}$ groove to the $91^{st}$ groove, and jut out from the $91^{st}$ groove. Accordingly, each groove of one groove group corresponding to the first phase of the stator 20 can have six layers of wires embedded therein, and four wire ends, that is, the first ends 11a and 11b of the wires 10a and 10b and the second ends of the additional two wires. Subsequently, based on the foregoing manner, additional wires can be further embedded in the other group of the grooves for the first phase, in the next two groups of grooves for the second phase and in the further next two groups of grooves for the third phase, so as to complete a stator winding having two sets of three phases of power generation windings with each groove 23 having six layers of straight portion 131 of wire 10 embedded therein. Finally, after the wire ends of the same phase are soldered, the wires for the three phases are further soldered in a Y-connection or in a connection of a star shape to complete the wire connection of the wound stator having six layers of wire.

The number of layers of wires 10 in a groove 23 of a stator 20 of the present invention is not limited to the four or six layers of wires as mentioned in the above embodiments. For example, if the above-mentioned additional abreast wires arranged in the radial direction which have 8 coils are replaced by the wires having 16 coils, each groove of the stator 20 would have 8 layers of wires after winding. If necessary, by increasing the depth of the groove 23, the number of double abreast wires 10 arranged in the radial direction and embedded in a groove group of one phase can be increased to, for example, 4 to 16 layers of wires. In this case, power generation efficacy can be enhanced rapidly and effectively.

Further, the wire 10 as adopted in the embodiments of the present invention is not limited to a wire having 16 coils. A wire having 8 coils may be used instead. For example, for the winding in a phase in which a groove of a stator 20 has four layers of wire, four wires having 8 coils are required.

Figure 7:
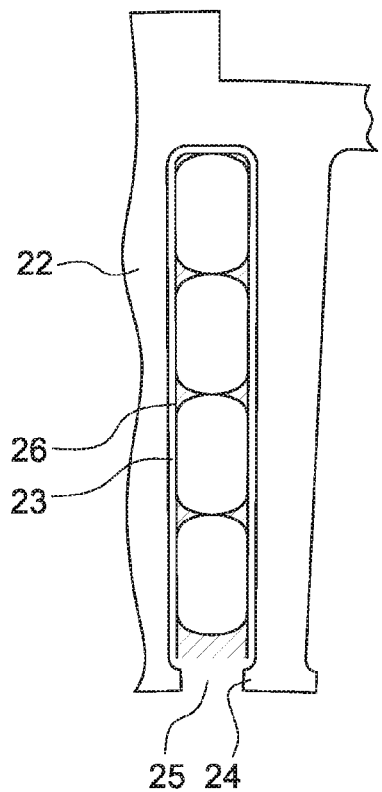
FIG. 7 is a partial, sectional view of a wound stator having single wire of large diameter embedded into a groove of the stator.

In contrast, if conventional 1.9 mm diameter wires are used, the straight portions thereof after being pressed forms a cross section of a generally elliptical shape having a major axis length of about 2.3 mm to 2.4 mm and a minor axis length of 1.4 mm. With the same groove width and depth, the groove 23 of the stator 20 can only receive 4 layers of such wires as shown in FIG. 7. The straight portions of a single wire, starting from the first end of the wire, are sequentially embedded in the corresponding grooves 23 of the stator 20 and wound around the stator 20 in the sequence of forward direction-reverse direction-forward direction-reverse direction so as to complete the winding to form a wound alternator stator having two sets of three phase windings with each groove of the wound stator having 4 layers of wires.

As mentioned above, the factors influencing the output efficacy of an alternator include the wire diameter and the number of coils as wound (i.e., the number of wire layers in the groove). Tests of cold temperature output and hot temperature output under different revolutions are conducted on the same rotor respectively combined with a wound stator having double abreast wires of 1.5 mm diameter embedded therein (see FIGS. 5A, 5B and 6), and with a wound stator having a single wire of 1.9 mm diameter embedded therein (see FIG. 7). The results are shown in the following Table 1:

TABLE 1

| | | Rev(rpm) | | | | | | | | | |
|---|---|---|---|---|---|---|---|---|---|---|---|
| Amp | | 1,600 | 1,800 | 2,000 | 2,500 | 3,000 | 4,000 | 5,000 | 6,000 | 7,000 | 8,000 |
| Cold temp. output | Single wire embedding | 113.3 | 124.8 | 132.8 | 145.3 | 152.0 | 158.1 | 161.2 | 163.4 | 164.9 | 165.6 |
| | Double abreast wire embedding | 101.9 | 124.2 | 141.9 | 170.0 | 185.8 | 200.3 | 206.8 | 210.6 | 213.0 | 215.1 |
| Hot temp. output | Single wire embedding | 94.3 | 104.7 | 112.1 | 122.7 | 128.5 | 133.0 | 135.3 | 136.6 | 137.5 | 138.0 |
| | Double abreast wire embedding | 80.9 | 100.7 | 118.0 | 144.0 | 158.6 | 170.4 | 175.5 | 177.9 | 179.0 | 178.9 |

Figure 6:
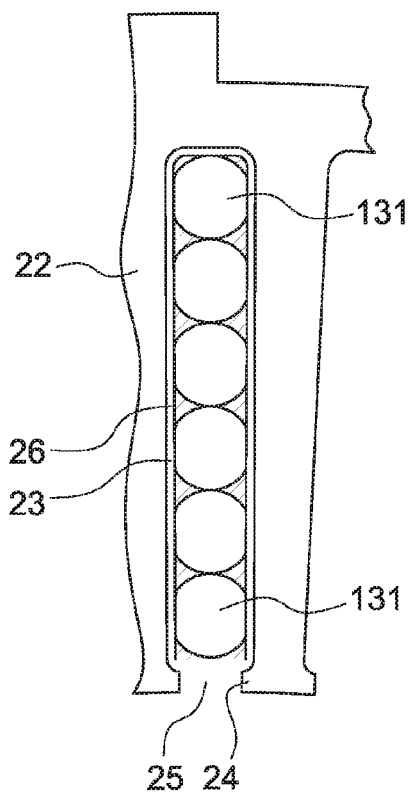
FIG. 6 is a partial, sectional view of a wound stator according to an embodiment of the present invention having double abreast wires of small diameter disposed in a radial direction and embedded into a groove of the stator.

As shown in the embodiment of FIG. 6, the two opposed flat sides of the flattened straight portions of each of the double abreast wires 10a, 10b are embedded in the groove 23 along the radial direction of the groove 23 so that the orientation of the double abreast wires 10a, 10b is along a radial direction of the groove 23. It can be seen from FIG. 6 that the groove 23 of the stator 20 comprises 6 layers of wire (i.e., 3 layers of the double abreast straight portion of the wires arranged in the radial direction). The advantage of the winding disclosed in FIGS. 5A and 5B lies in allowing wires with a diameter smaller than the diameter of the conventional wires (e.g., conventional wire diameter of 1.9 mm) to be used so that more layers of wires can be embedded in the groove 23 of the stator to enhance the output performance of the alternator under high revolutions. For example, if enameled copper wires with 1.5 mm diameter are used, the straight portions thereof after being pressed form a cross section of a generally elliptical shape having a major axis length of 1.6 mm and a minor axis length of 1.4 mm, and therefore 6 layers of such pressed wires in the groove 23 are filled in the groove 23 to form the structure shown in FIG. 6. Of course, the present invention is not limited to the use of the wire with 1.5 mm diameter for the double abreast wires 10a, 10b. Those wires with other smaller diameters (such as 1.7 mm, 1.6 mm and so on) are also workable.

Figure 8A:
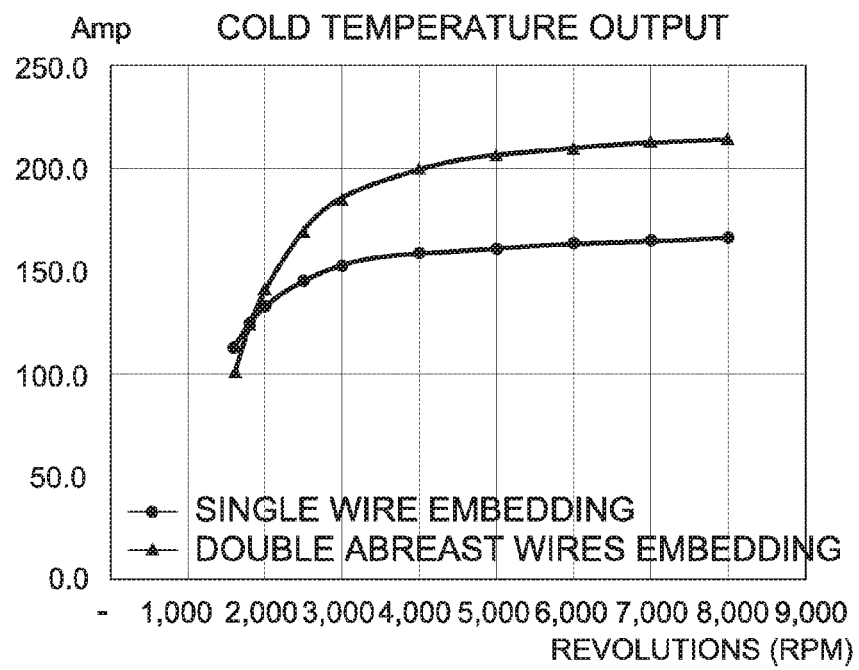
FIG. 8A is a graph of cold temperature output drawn according to Table 1 in the specification.
Figure 8B:
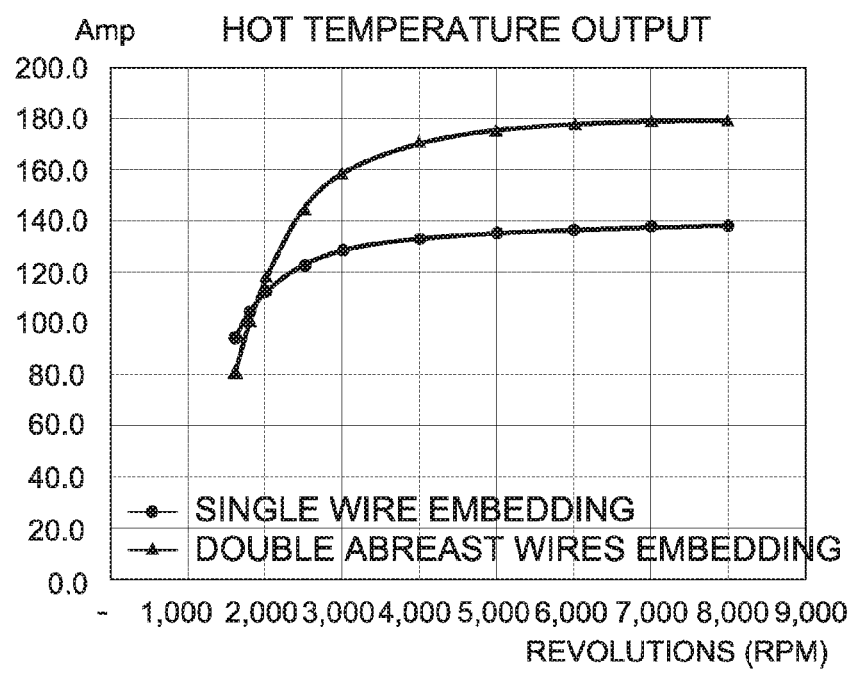
FIG. 8B is a graph of hot temperature output drawn according to Table 1 in the specification.

The cold temperature output shown in Table 1 is measured directly at the beginning of testing for the stator in combination with the rotor; the hot temperature output is measured at about 40 to 50 minutes after the test for the stator in combination with the rotor has begun. The temperature of the stator is higher under hot temperature test than it is under cold temperature test. The condition under hot temperature test is closer to the actual working condition of the alternator. In view of Table 1, a comparison between the wound stator shown in FIG. 6 with double abreast wires of 1.5 mm diameter embedded therein and the wound stator shown in FIG. 7 with single wire of 1.9 mm diameter embedded therein reveals that both the hot and cold temperature output of the former are always greater than those of the latter when the revolutions of the rotor are higher than 2,000 rpm. That is, the current output efficacy of the former is better than the latter under high revolutions. As shown in the cold temperature output graph of FIG. 8A, and the hot temperature output graph of FIG. 8B, the wound stator having double abreast wires embedded therein with pressed wires of small diameter (e.g., 1.5 mm) has better output efficacy than the wound stator having a single wire embedded therein with conventional wires such as a wire of 1.9 mm diameter.

Further to the above, the size of the magnet shoes formed at the end of the separating posts 22 can be reduced so as to increase the dimension of the openings 25. As shown in FIG. 6, in the present invention, the width of the groove 23 of the stator 20 is designed to allow receiving only one single wire 10, and therefore the groove width of the groove 23 is slightly larger than the diameter of the wire 10. In addition, the end of the separating post 22 has a magnetic shoe 24 of a reduced size makes the width of the groove opening 25 close to the width of the groove 23 so that the straight portion 131 of the wire 10 can be directly and completely embedded in the groove 23 from the opening 25. As for the efficacy of power generation, surprisingly, after winding is completed according to the above embodiment of the present invention, the power generation efficacy is close to the case where the size of a magnetic shoe is larger.

The advantage of the foregoing stator structure in which the size of the magnetic shoe 24 of the stator 20 is decreased to increase the dimension of the opening 25 of the groove 23 according to the present invention is that: it is easy for the entire straight portion 131 of the wire 10 to be directly embedded in the groove 23, thereby significantly lowering the complexity of winding, increasing the winding speed, and making possible automatic winding by using a lead-in wire jig. Thus, production efficiency is improved.

The structure of the wound stator with double abreast wires embedded therein as disclosed in this application is not limited to that shown in FIGS. 5A, 5B and 6. In an alternative approach as shown in FIG. 9, the double abreast wires 131 are disposed adjacent to each other and thus is oriented in a circumferential direction of the stator. The straight portions of double abreast wires are, starting from the first end, sequentially embedded in a forward direction in the corresponding grooves of the stator to surround the stator in a manner and are then sequentially embedded in the corresponding grooves of the stator in a reverse direction to surround the stator so that each of the corresponding grooves has two radial layers of wires disposed adjacent to each other in the circumferential direction. Similarly, the above double abreast wires can be further respectively connected in series to the first end of another double abreast wires, and the straight portions of the other double abreast wires are disposed adjacent to each other in a circumferential direction of the stator and are, starting from the first end thereof, sequentially embedded in a forward direction in the corresponding grooves of the stator to surround the stator and jut out with the second end of the other double abreast wires so that each of the corresponding grooves has three radial layers of wires adjacent to each other in the circumferential direction. In another embodiment, the forgoing double abreast wires with three radial layers of wires embedded in the grooves of the stator are then sequentially embedded in the corresponding grooves of the stator in a reverse direction and jut out with the second end of the other two wires so that each of the corresponding grooves has four radial layers of wires adjacent to each other in the circumferential direction.

A wound stator as illustrated in the above may be combined with a rotor 40 as shown in FIG. 10 to form a vehicle alternator assembly. The rotor 40 of the alternator is rotatable relative to the stator (not shown). The rotor 40 includes a rotating shaft 41, a slip ring 42, a bearing 43, a magnetic field coil 44, a first claw magnetic pole element 45, and a second claw magnetic pole element 46. The wound stator surrounds the rotor 40 in coaxial form. When electric power from a vehicle storage battery is supplied to the magnetic field coil 44 through the slip ring 42, the first claw magnetic pole element 45 and the second claw magnetic pole element 46 are magnetized under the effect of electromagnetic induction to generate a magnetic field. When the rotor 40 is driven by power from an engine to rotate relative to the wound stator, the direction of the magnetic field also changes with the rotation of the rotor 40. In that case, the stator coil generates an alternating current via electromagnetic induction.

In particular, when a current is passed through the magnetic field coil 44 of the rotor 40, the first claw magnetic pole element 45 and the second claw magnetic pole element 46 may be magnetized into an N pole and an S pole due to electromagnetic induction. As such, the claw-shaped bodies 451, 461 of each pair of adjacent claw magnetic pole elements 45, 46 may produce a magnetic field. During the rotation of the rotor 40, electromagnetic induction further occurs between the directions of the magnetic fields and the wire 10 in the stator winding to generate an alternating current.

Further, as shown in FIG. 10, the first claw magnetic pole element 45 of the rotor 40 may have four, six or eight claw-shaped bodies 451, while the second claw magnetic pole element 46 may also have four, six or eight claw-shaped bodies 461, in which the number of claw-shaped bodies 451 of the first claw magnetic pole element 55 is the same as that of claw-shaped bodies 461 of the second claw magnetic pole element 46. The first claw magnetic pole element 45 and the second claw magnetic pole element 46 are engaged with each other so that the claw-shaped bodies 451 of the first claw magnetic pole element 45 and the claw-shaped bodies 461 of the second claw magnetic pole element 46 are adjacent to each other while slightly spaced apart from each other. As discussed above, when a current is passed through a magnetic pole coil 44 of a rotor, the first claw magnetic pole element 45 may be magnetized into an N pole due to electromagnetic induction, and the second claw magnetic pole element 46 may be magnetized into an S pole due to electromagnetic induction. Therefore, magnetic lines of force may be generated between each pair of the adjacent claw-shaped body 451 of the first claw magnetic pole element 45 forming the N pole, and claw-shaped body 461 of the second claw magnetic pole element 46 forming the S pole so as to form a magnetic field. If the magnetic field coil is arranged to be wound in a direction opposite the foregoing magnetic pole coil, the first claw magnetic pole element 45 is magnetized into the S pole due to electromagnetic induction, and the second claw magnetic pole element 46 is magnetized into the N pole due to electromagnetic induction. Similarly, magnetic lines of force may also be generated between each pair of the adjacent claw-shaped body 451 of the first claw magnetic pole element 45 forming the S pole, and claw-shaped body 461 of the second claw magnetic pole element 46 forming the N pole so as to form a magnetic field.

Figure 11:
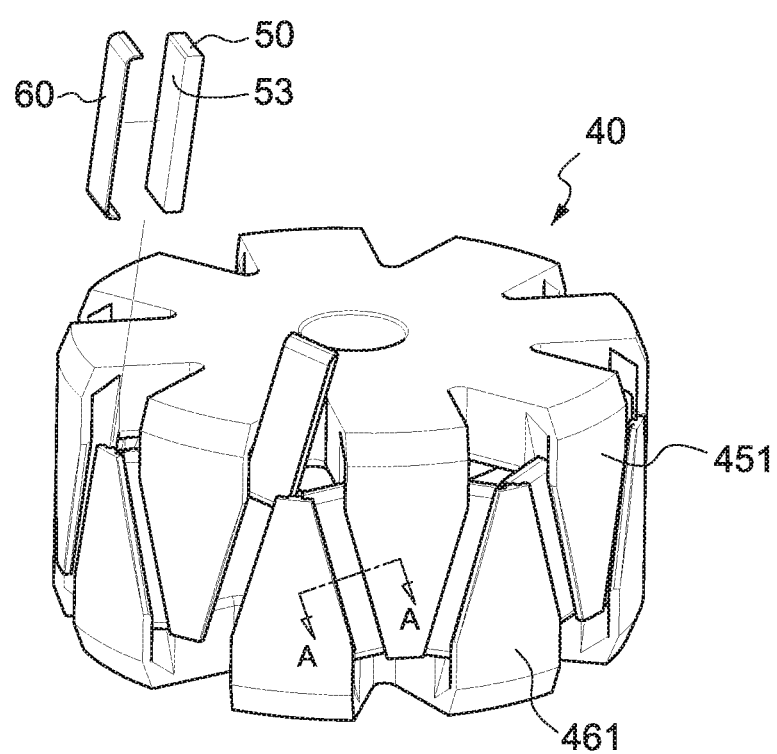
FIG. 11 is a schematic view showing magnetic poles of a rotor for an alternator according to an embodiment of the present invention.
Figure 12:
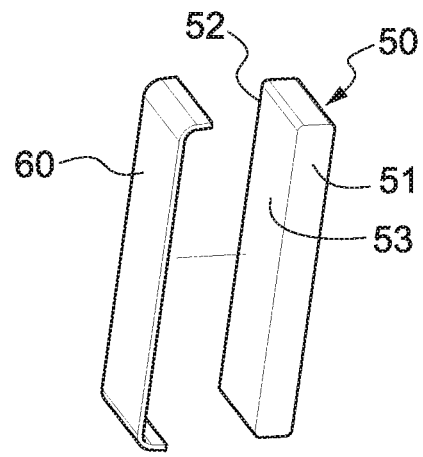
FIG. 12 is schematic view showing a permanent magnet and its cover according to an embodiment of the present invention.

As shown in FIG. 11, in a preferred embodiment of the present invention, a permanent magnet 50 or a permanent magnet 50 with a cover 60 is disposed between each pair of the claw-shaped body 451 and its adjacent claw-shaped body 461. As shown in FIGS. 11 and 12, the permanent magnet 50 may be fixedly disposed between each pair of the claw-shaped body 451 and the claw-shaped body 461 which are adjacent to each other. An N polar end 51 of the permanent magnet 50 is in contact with the claw-shaped body 451 of the first claw pole element 45 that forms the N pole, and an S polar end 52 of the permanent magnet 50 is in contact with the claw-shaped body 461 of the second claw pole element 46 that forms the S pole. As such, when an electric current enters the magnetic-pole coil of the rotor and a magnetic field is formed between each pair of the claw-shaped body 451 and the claw-shaped body 461, the permanent magnet 50 can block linear passing of the magnetic lines between the adjacent claw-shaped bodies 451 and 461, and avoid magnetic leakage, so as to reinforce the magnetic field formed by the adjacent claw-shaped bodies 451 and 461 and further increase the generating capacity of the alternator.

If the first claw pole element 45 is magnetized into an S pole due to electromagnetic induction, and the second claw pole element 46 is magnetized into an N pole due to electromagnetic induction, the permanent magnet 50 is disposed in such a manner that its N polar end 51 is in contact with the claw-shaped body 461 of the second claw pole element 46 and its S polar end 52 is in contact with the claw-shaped body 451 of the first claw pole element 45.

In short, when the permanent magnet 50 is fixed between each pair of the adjacent claw-shaped body 45 and the claw-shaped body 46, which has generated polarities due to electromagnetic induction, a polar end of the permanent magnet 50 is in contact with the claw-shaped body having the same polarity and likewise for the other polar end.

Also, as shown in FIG. 12, an outer surface 53 of the permanent magnet 50 fixed between adjacent the claw-shaped bodies 451 and 461 that face outward is covered with a cover 60 made of a non-magnetic material. Not only can the permanent magnet 50 be protected by the rigidity of the cover 60 but magnetic leakage can also be further avoided through the non-magnetic properties of the cover 60. In one embodiment of the invention, the non-magnetic material is stainless steel.

Figure 13:
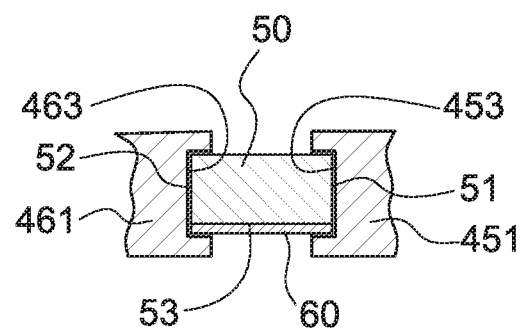
FIG. 13 is a sectional view taken along Line A-A in FIG. 11 in which the permanent magnet and its cover are mounted to the poles according to an embodiment of the present invention.
Figure 14:
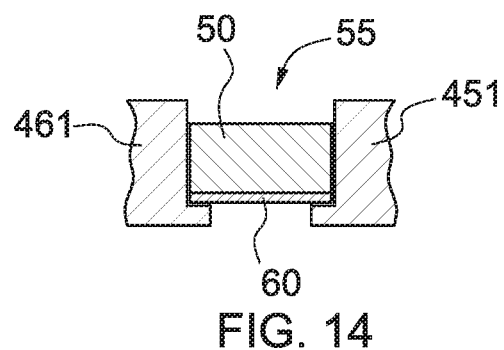
FIG. 14 is a sectional view taken along Line A-A in FIG. 11 in which the permanent magnet and its cover are mounted to the poles according to another embodiment of the present invention.

The permanent magnet 50 or the permanent magnet 50 with a cover 60 may be fixed between two adjacent claw-shaped bodies 451 and 461 in an embedded manner. FIG. 13, which is a cross sectional view taken along Line A-A in FIG. 11, shows a manner of embedding the permanent magnet 50 with its cover 60 between the two adjacent claw-shaped bodies 451 and 461. The two opposite sides of a claw-shaped body 451 of the first claw pole element 45 and a claw-shaped body 461 of the second claw pole element 46 adjacent thereto are respectively provided with a groove 453 and a groove 463 by means of turn-milling, and the permanent magnet 50 with its cover 60 can be embedded between the two adjacent claw-shaped bodies 451 and 461 and received by the two grooves 453 and 463. The N polar end 51 of the permanent magnet 50 is received in the groove 453 of the N-pole claw-shaped body 451, and the S polar end 52 thereof is received in the groove 463 of the S-pole claw-shaped body 461. In addition, FIG. 14, which is another sectional view taken along Line A-A in FIG. 11, shows another manner of embedding the permanent magnet 50 with its cover 60 into between two adjacent claw-shaped bodies 451 and 461. A concave portion 55 is formed between inner sides of the claw-shaped bodies 451 and 461 by means of turn-milling, and the permanent magnet 50 with its cover 60 may be received in the concave portion 55 so as to be embedded between the two adjacent claw-shaped bodies 451 and 461. The N polar end 51 of the permanent magnet 50 abuts against the N-pole claw-shaped body 451, and the S polar end 52 thereof abuts against the S-pole claw-shaped body 452.

To enable the permanent magnet 50 or the permanent magnet 50 and its cover 60 to be further fixed between the adjacent claw-shaped bodies 451 and 461, an adhesive can be applied between the permanent magnet 50 or the permanent magnet 50 with its cover 60 and the claw-shaped bodies 451 and 461.

The rotor structure with the permanent magnet 50 disclosed above can effectively increase the output current. Tests of cold temperature output and hot temperature output under different revolutions are conducted on the same wound stator made by double abreast wires of 1.5 mm diameter embedded therein (as shown in FIGS. 5A, 5B and 6) in combination with a rotor 40 with permanent magnet 50, and in combination with a rotor without permanent magnet, respectively. The results are shown in the following Table 2:

TABLE 2

| AMP | | Rev(rpm) | | | | | | | | | |
|---|---|---|---|---|---|---|---|---|---|---|---|
| | | 1,600 | 1,800 | 2,000 | 2,500 | 3,000 | 4,000 | 5,000 | 6,000 | 7,000 | 8,000 |
| Cold temp. output | With permanent magnet | 135.0 | 154.0 | 171.0 | 193.0 | 205.0 | 214.0 | 217.0 | 219.0 | 221.0 | 222.0 |
| | Without permanent magnet | 90.0 | 115.0 | 134.0 | 165.0 | 182.0 | 197.0 | 204.0 | 208.0 | 211.0 | 213.0 |
| Hot temp. output | With permanent magnet | 106.0 | 125.0 | 139.0 | 159.0 | 170.0 | 178.0 | 182.0 | 184.0 | 185.0 | 185.0 |
| | Without permanent magnet | 75.0 | 97.0 | 115.0 | 143.0 | 158.0 | 171.0 | 176.0 | 178.0 | 180.0 | 181.0 |

Figure 15A:
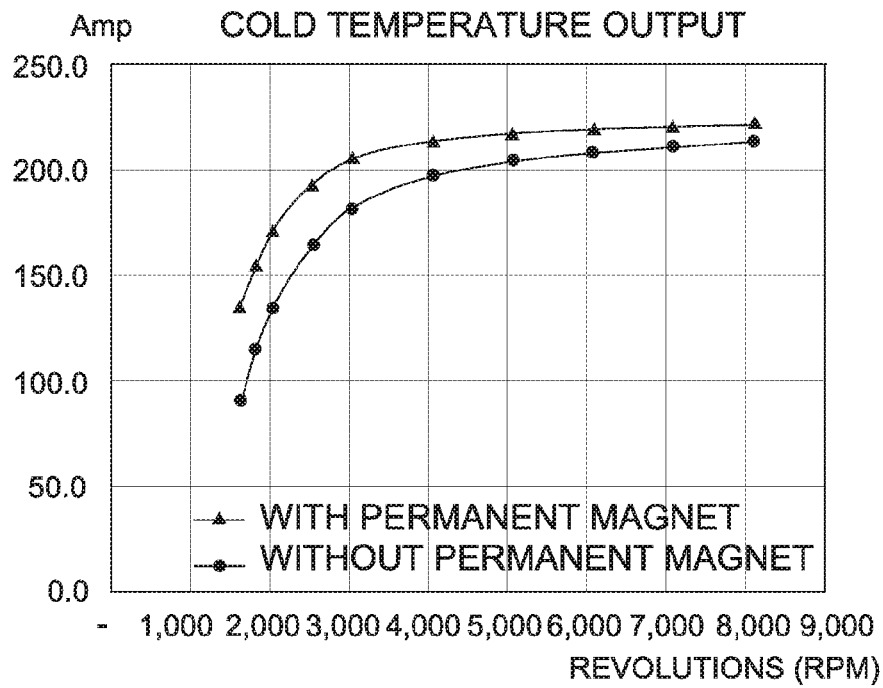
FIG. 15A is a graph of cold temperature output drawn according to Table 2 in the specification.
Figure 15B:
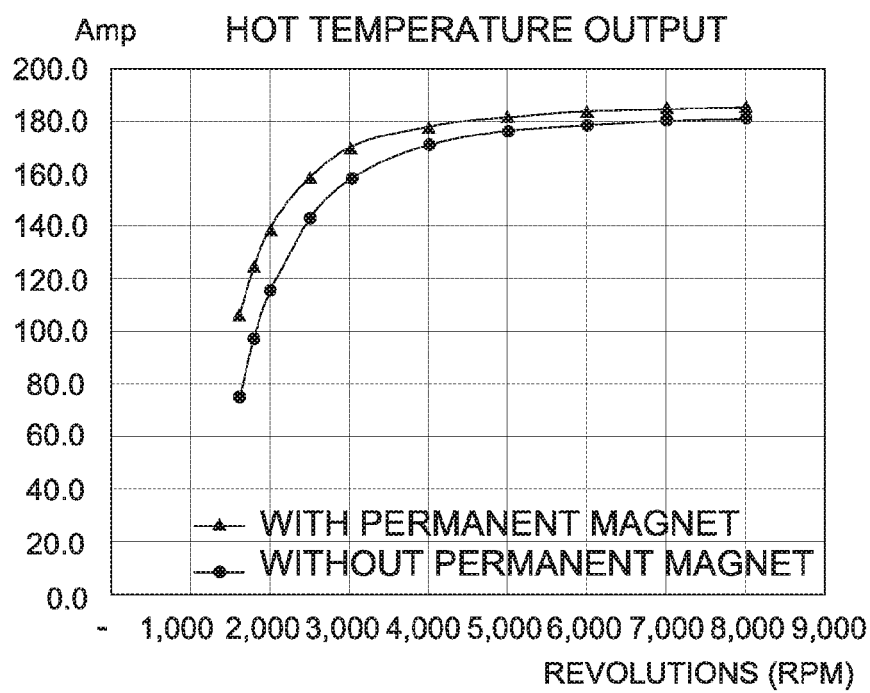
FIG. 15B is a graph of hot temperature output drawn according to Table 2 in the specification.

According to the result of Table 2, the cold temperature output current and the hot temperature output current of the rotor having permanent magnet 50 embedded between the adjacent N-pole claw-shaped body and S-pole claw-shaped body are always greater than those produced by the rotor without permanent magnet embedded between the bodies under any revolution. Please refer to the cold temperature output graph of FIG. 15A and the hot temperature output graph of FIG. 15B. The graphs indicate that the rotor structure having permanent magnet embedded between the adjacent N-pole claw-shaped body and S-pole claw-shaped body of the poles achieve better power generation efficacy than that without the permanent magnet embedded therebetween.

The rotor according to a preferred embodiment of the present invention should not be construed as being limited to the above specific embodiments. For example, the permanent magnets may be fixed between two adjacent claw-shaped bodies in another manner, or the permanent magnets may be disposed between only a part of two adjacent claw-shaped bodies.

A vehicle alternator consisting of the wound stator having double abreast wires embedded therein in combination with the rotor as described above has a miniature structure and also has the characteristic of high power generation efficacy. Meanwhile, the invention simplifies manufacturing procedures, makes automation easier, and allows for lower manufacturing costs. The foregoing embodiments are illustrative of the technical concepts and characteristics of the present invention so as to enable a person skilled in the art to gain insight into the content disclosed herein and to implement the present invention accordingly. However, it is understood that the embodiments are not intended to restrict the scope of the present invention. Hence, all equivalent modifications and variations made to the disclosed embodiments without departing from the spirit and principle of the present invention should fall within the scope of the appended claims.

What is claimed is:

1. A wound stator of an alternator, comprising:
   a stator; and
   a group of wires comprising a plurality of abreast wires, wherein the group of wires are embedded in corresponding grooves of the stator sequentially and the abreast wires in the grooves are oriented in a radial direction of the stator,
   wherein each of the abreast wires comprises:
   a plurality of wave-shaped coils, each of the wave-shaped coils being formed of straight portions and curved portions that alternate with each other, wherein the cross section of the straight portions of each of said wires is generally in elliptical shape, and the straight portions of the group of wires are sequentially embedded in the corresponding grooves of the stator along a direction of the major length of the elliptical shape,
   wherein the group of wires for a stator comprises two abreast wires and each of the two abreast wires comprises a first end and a second end, and
   wherein the straight portions of the two abreast wires are, starting from the first end, sequentially embedded in a forward direction in the corresponding grooves of the stator so that each of the corresponding grooves of the stator has two layers of wires embedded in a radial direction of the stator, and are then sequentially embedded in the corresponding grooves of the stator in a reverse direction and jut out from one of the corresponding grooves with the second end so that each of the corresponding grooves has four layers of wires embedded in a radial direction of the stator.

2. The wound stator according to claim 1, wherein the two abreast wires are respectively connected in series to the first end of another two abreast wires, the other two abreast wires starting from the first end thereof sequentially embedded in a forward direction in the corresponding grooves of the stator and jut out from one of the corresponding grooves with the second end of the another two abreast wires so that each of the corresponding grooves has six layers of wires embedded in a radial direction of the stator.

3. The wound stator according to claim 1, wherein the two abreast wires are respectively connected in series to the first end of another two abreast wires, the other two abreast wires, starting from the first end thereof, are sequentially embedded in a forward direction in the corresponding grooves of the stator and are then sequentially embedded in the corresponding grooves of the stator in a reverse direction and jut out from one of the corresponding grooves with the second end of the other two abreast wires so that each of the corresponding grooves has eight layers of wires disposed in a radial direction of the stator.

4. The wound stator according to claim 3 wherein the generally elliptical shape has two flat sides.

5. The wound stator according to claim 3, wherein the stator comprises an annular body, the annular body has a plurality of separating posts protruding inwardly and radially from an inner circumference of the annular body, an end of each of the separating posts extending from its two sides to form a plurality of magnetic shoes, and the grooves in the radial direction are defined between the separating posts, each of the grooves has an opening defined between adjacent magnetic shoes at the ends of adjacent separating posts, the width of each of the grooves is configured to receive only one wire, and the width of the openings of the grooves is slightly larger than the size of the straight portions of the wire, so the straight portions of the wires can be directly embedded in the grooves from the openings.

6. The wound stator according to claim 3, wherein an electrical insulating material is laid on the surface of each groove of the stator, and the electrical insulating material comprises a material selected from a group consisting of a pressed paper board, a plastic film, a polyester film, aramid paper, and epoxy resin.

7. The wound stator according to claim 3, wherein the stator has 72 to 96 grooves.

8. The wound stator according to claim 3, wherein the plurality of the wave-shaped coils of the wires has 6 to 8 curved portions in the same curving direction.

* * * * *